US012735037B2

(12) United States Patent
Porter et al.

(10) Patent No.: US 12,735,037 B2
(45) Date of Patent: Sep. 15, 2026

(54) LONGITUDINAL RESPONSE CONTROL OF HOST DURING AGGRESSIVE TURNING MANEUVER OF A LEADING TARGET

(71) Applicant: GM GLOBAL TECHNOLOGY OPERATIONS LLC, Detroit, MI (US)

(72) Inventors: Audrey D. Porter, Warren, MI (US); Kevin A. O'Dea, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 24 days.

(21) Appl. No.: 19/035,325

(22) Filed: Jan. 23, 2025

(65) Prior Publication Data

US 2026/0208731 A1 Jul. 23, 2026

(51) Int. Cl.
*B60W 30/16* (2020.01)
*B60W 50/00* (2006.01)

(52) U.S. Cl.
CPC ...... *B60W 30/162* (2013.01); *B60W 50/0097* (2013.01); *B60W 2520/105* (2013.01); *B60W 2520/12* (2013.01); *B60W 2520/14* (2013.01); *B60W 2540/18* (2013.01); *B60W 2540/20* (2013.01); *B60W 2554/4043* (2020.02); *B60W 2554/801* (2020.02); *B60W 2554/802* (2020.02); *B60W 2554/803* (2020.02)

(58) Field of Classification Search
None
See application file for complete search history.

(56) References Cited

U.S. PATENT DOCUMENTS

| | | | | |
|---|---|---|---|---|
| 10,328,935 | B2 | 6/2019 | O'Dea | |
| 10,919,532 | B2 | 2/2021 | Ahmed | |
| 12,110,024 | B2 | 10/2024 | Vijaya Kumar | |
| 2017/0341647 | A1* | 11/2017 | Rajvanshi | B60W 30/08 |
| 2024/0326797 | A1* | 10/2024 | Konishi | B60W 50/00 |
| 2025/0296556 | A1* | 9/2025 | Kwon | B60W 30/09 |

FOREIGN PATENT DOCUMENTS

| | | | |
|---|---|---|---|
| DE | 102014212700 | A1 | 1/2016 |
| DE | 102017111170 | A1 | 11/2017 |

* cited by examiner

*Primary Examiner* — Shayne M. Gilbertson
(74) *Attorney, Agent, or Firm* — Quinn IP Law

(57) ABSTRACT

A method controls a host having an adaptive cruise control (ACC) system by determining predicted lateral positions of the target using a current lateral position and velocity thereof relative to the host and a lane. In response to the positions being reliable, host stability, and the host still following the target, a target deceleration and turning out of the host's path above threshold rates are detected while the host is controlled according to a default closest-in-path (CIP)-based ACC strategy. The default strategy is disabled and the host is controlled as if the target is no longer located in the host's path. The dynamic state is controlled as if the target is no longer located in the host's path when a time-to-contact value is greater than a time threshold, or to a vehicle ahead of the target when the TCC value is less than the time threshold.

20 Claims, 4 Drawing Sheets

LONGITUDINAL RESPONSE CONTROL OF HOST DURING AGGRESSIVE TURNING MANEUVER OF A LEADING TARGET

INTRODUCTION

Modern vehicles are equipped with an adaptive cruise control (ACC) system operable for dynamically modifying the vehicle's ground speed in response to its dynamically changing environment. An ACC system of a host vehicle ("host") employs an onboard processor and a suite of remote sensors to detect objects located in the host's path, for instance a target vehicle ("target") located in front of the host and traveling in the same lane. After an operator of the host sets a desired speed and the host approaches a slower-moving target from behind, the ACC system performs a myriad of automated control actions to reduce the speed of the host and thereafter maintain a desired following distance between the host and target.

Certain driving maneuvers of the target require the performance of rapid speed calculations and control adjustments by the ACC system of the host. For example, onboard vehicle sensors of the host may detect that the target has turned into a parking lot or changed lanes, and therefore is no longer present in the host's path. In response to such an event, the ACC system may first reduce speed of the host, wait for the target to fully exit the lane, and thereafter command positive acceleration of the host to re-attain the operator's previously selected desired speed.

SUMMARY

Disclosed herein are automated vehicle control systems and related control methodologies for controlling a longitudinal response of a host vehicle ("host") equipped with an adaptive cruise control (ACC) system. The present solutions are intended to transition the host to positive acceleration earlier than would ordinarily occur under the control of an ACC system lacking the benefit of the programming described below. Using the present teachings, an operator of the host will experience reduced acceleration delay or lag, relative to default closest-in-path (CIP)-based ACC control strategies, during a particular maneuver of a leading target vehicle ("target"), i.e., a turning maneuver during which the target quickly reduced speed and exits the host's lane.

In particular, the computer-based methods described herein are configured to robustly determine when the host may behave as if the target is no longer in the host's path. This determination is made dynamically based on two conditions: the location of the target relative to the host, and the location of the target relative to the lane in which the host is currently traveling. Additionally, the implementation of the present strategy in one or more embodiments entails operation of three parallel algorithms. The first algorithm (Algorithm #1) predicts the target's lateral position relative to the host and the lane, with this prediction performed using the current lateral position and velocity of the target relative to the lane. The second algorithm (Algorithm #2) is used to determine whether the predictions from the first algorithm are sufficiently reliable, i.e., trustworthy and thus actionable, as well as whether the host is laterally stable in the lane and the host is still following the same target. The third algorithm (Algorithm #3), which is executed when the second algorithm determines that the above-noted conditions have been satisfied, ultimately detects that the host is operating in a predetermined scenario in which the target decelerates significantly and turns sharply out of the host's path. In this case, the ACC system controls the host's acceleration response as though the target is no longer located in the host's path, thereby transitioning to positive acceleration sooner than would occur with a default CIP vehicle-based ACC control scheme.

In particular, a method for controlling a host equipped with an ACC system and traveling in a lane includes sensing a current lateral position of a target relative to the host via the ACC system and sensing a current lateral velocity of the target relative to the lane via the ACC system. The method includes determining predicted lateral positions of the target, via the ACC system using a current lateral position of the target and the current lateral velocity of the target. The predicted lateral positions include a predicted lateral position of the target relative to the host and a predicted lateral position of the target relative to the lane.

In response to the predicted lateral positions of the target being reliable relative to a calibrated standard, the host being laterally stable in the lane, and the host still following the target, the method includes detecting when the target is decelerating and turning out of a path of the host at rates exceeding corresponding thresholds, while the host is being controlled in accordance with a default closest-in-path (CIP)-based ACC strategy. The control response in this portion of the method further includes temporarily disabling the default CIP-based ACC strategy and thereafter controlling a dynamic state of the host via the ACC system as if the target is no longer located in the path of the host, thus causing the host to transition to positive acceleration.

Detecting when the target is decelerating and turning out of the path of the host may include sensing a current lateral position of the target relative to the lane via one or more sensors of the ACC system. Determining the predicted lateral positions of the target relative to the lane may include locating a left boundary and a right boundary of the lane via the ACC system, and then determining a width of the lane using the left boundary and the right boundary.

The standard noted above may include a calibrated distance threshold between the host and the target. In such an embodiment, the method further includes sensing a linear distance between the host and the target, and comparing the linear distance to a calibrated distance threshold to determine whether the predicted lateral positions of the target are reliable.

One or more embodiments of the method includes measuring performance parameters of the host and determining if the host is laterally stable within the lane using the performance parameters. Measuring the performance parameters of the host may include measuring a yaw rate, a turn signal ON/OFF state, a steering angle, and a steering angle rate of the host, and wherein determining if the host is laterally stable within the lane using the performance parameters includes comparing absolute values of the performance parameters to corresponding thresholds via the ACC system.

Detecting when the target is decelerating and turning out of a path of the host at rates exceeding corresponding thresholds includes comparing the longitudinal acceleration of the host to an acceleration threshold, and temporarily disabling the default CIP-based ACC strategy when the longitudinal acceleration of the host is less than the acceleration threshold.

The method may also include determining a time-to-contact (TTC) value as a time duration after which the host would contact a vehicle or other object located in front of the target, given current velocities and positions of the host and object, and then controlling the dynamic state of the host via the ACC system as if the target is no longer located in the path of the host only when the TCC value is greater than a time threshold. In contrast, the dynamic state of the host is controlled via the ACC system according to a vehicle located ahead of the target only when the TCC value is less than the time threshold.

Also disclosed herein is an ACC system for a host traveling in a lane. The ACC system may include a sensor suite connected to the host, and an electronic control unit (ECU) in communication with the sensor suite. The ECU includes a processor and a computer storage medium on which is record instructions. Execution of the instructions by the processor causes the ECU to sense a current lateral position of a target vehicle ("target") relative to the host, sense a current lateral velocity of the target relative to the lane, and determine predicted lateral positions of the target using the current lateral position of the target and the current lateral velocity of the target. As noted above, the predicted lateral positions include a predicted lateral position of the target relative to the host and a predicted lateral position of the target relative to the lane.

In response to the predicted lateral positions of the target being reliable relative to a calibrated standard, the host being laterally stable in the lane, and the host still following the target, the ECU detects when the target is decelerating and turning out of a path of the host at rates exceeding corresponding thresholds, while the host is being controlled in accordance with a default closest-in-path (CIP)-based ACC strategy. The ECU also temporarily disables the CIP-based ACC strategy and thereafter controlling a dynamic state of the host via the ACC system as if the target is no longer located in the path of the host, thus causing the host to transition to positive acceleration.

Aspects of the disclose pertain to a host vehicle having a set of road wheels connected to a vehicle body of the vehicle, a set of torque actuators operable for controlling a dynamic state of the host vehicle, and an ACC system. The ACC system in one or more implementations includes a sensor suite and an ECU. The sensor suite is connected to the vehicle body. The ECU, which is in communication with the sensor suite, includes a processor and a computer storage medium on which is record instructions. Execution of the instructions by the processor causes the ECU to sense a current lateral position of a target vehicle relative to the host vehicle and sense a current lateral velocity of the target vehicle relative to the lane. The ECU is also caused to determine predicted lateral positions of the target vehicle using the current lateral position of the target vehicle and the current lateral velocity of the target vehicle, the predicted lateral positions including a predicted lateral position of the target vehicle relative to the host and a predicted lateral position of the target vehicle relative to the lane.

As with the above-summarized embodiments, and in response to the predicted lateral positions of the target vehicle being reliable relative to a calibrated standard, the host vehicle being laterally stable in the lane, and the host vehicle still following the target, the ECU detects when the target vehicle is decelerating and turning out of a path of the host vehicle at rates exceeding corresponding thresholds, while the host vehicle is being controlled in accordance with a default closest-in-path (CIP)-based ACC strategy. The ECU also temporarily disables the CIP-based ACC strategy and thereafter control a dynamic state of the host as if the target vehicle is no longer located in the path of the host vehicle, thus causing the host vehicle to transition to positive acceleration.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1:
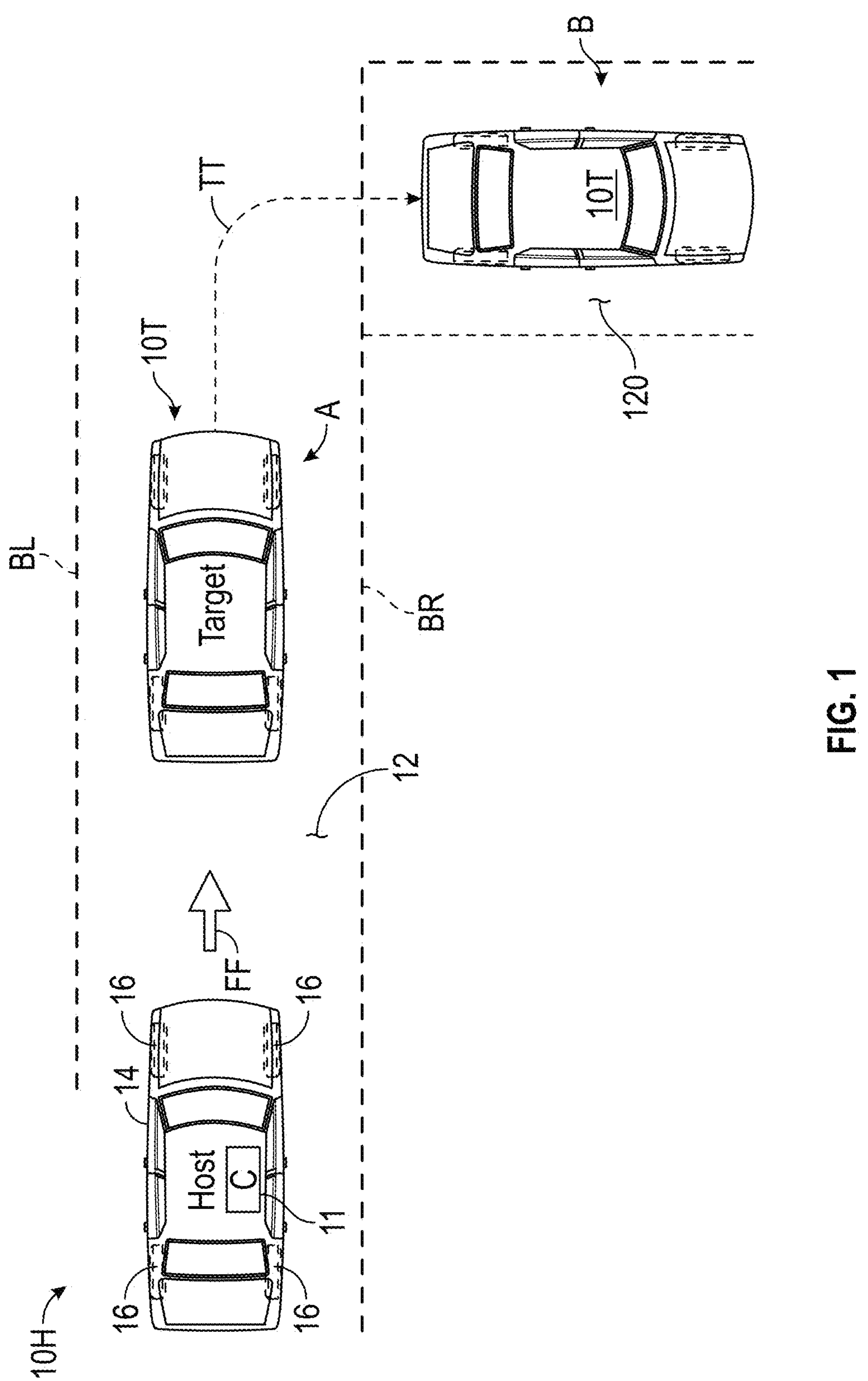
FIG. 1 illustrates a representative host vehicle ("host") equipped with a control system programmed with control logic in accordance with the present disclosure.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numerals correspond to like or similar components throughout the several Figures, FIG. 1 illustrates a trailing host vehicle ("host") 10H and a leading target vehicle ("target") 10T both traveling in a lane 12. The lane 12 in turn is defined or demarcated by respective left and right boundaries BL and BR. The host 10H is depicted as a representative passenger vehicle ("host vehicle") having a vehicle body 14 and road wheels 16 in rolling contact with a surface of the lane 12. The present teachings also may be used with other wheeled vehicles, including but not limited to motorcycles, trucks, farm equipment, sport utility vehicles, recreational vehicles, and other motor vehicles or mobile platforms in different implementations.

The host 10H includes an adaptive cruise control (ACC) system 11, a representative embodiment of which is described below with reference to FIG. 2. The ACC system 11 may also provide other possible autonomous, semi-autonomous, or other automated driving capabilities. The term "automated driving capabilities" as used herein broadly refers to driving-related actions or functions automatically taken by the host 10H without a driver's request or intervention, and includes actions falling within Levels 1-4 of the National Highway Traffic Safety Administration (NHTSA) classification system, as appreciated in the art.

In particular, the ACC system 11 is configured to control the dynamic state of the host 10H in response to actions of a leading target vehicle ("target") 10T. For instance, the host 10H may be traveling in lane 12 in the direction of arrow FF while trailing the target 10T, such that the target 10T leads the host 10H as shown. In this situation, a driver (not shown)

of the target 10T may initiate a rapid turning maneuver into an intersecting lane 120, e.g., an entry to a parking lot or a crossing lane at a stop light/traffic intersection. A representative righthand turn of the target 10T from a first position A in lane 12 to a second position B in lane 120 is indicated in FIG. 1 by arrow TT.

The representative turning maneuver of the target 10T causes the target 10T to rapidly decelerate and turn sharply out of the path of the host 10H. In a typical ACC system, the host 10H will transition to positive acceleration after a short delay of about 300 milliseconds (ms) to about 700 ms. While such a delay is relatively short, the transition may occur later than a driver of the host 10H, absent automated intervention, would ordinarily command via manual throttle input. The present ACC-based control strategy seeks to shorten this delay by commanding an earlier transition to a positive acceleration state. As a result, the acceleration performance of the host 10H during an ACC-assisted driving response to an aggressive turning maneuver of the target 10T of FIG. 1 is better aligned with a driver's expectations.

Figure 2:
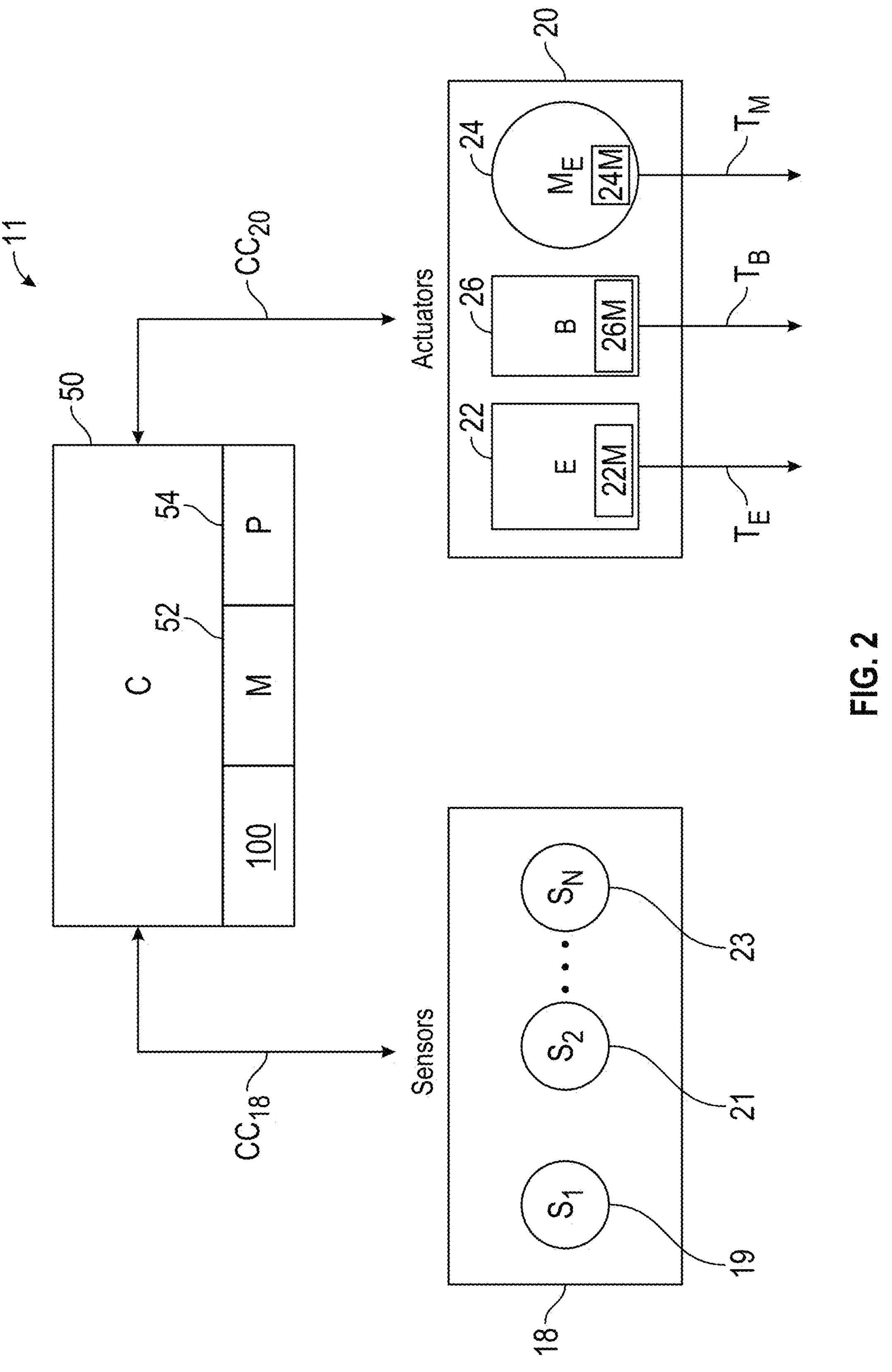
FIG. 2 is a block diagram of the control system for use with the host of FIG. 1.

Referring to FIG. 2, the ACC system 11 noted above may include a sensor suite ("sensors") 18, a set of torque actuators ("actuators") 20, and an electronic control unit (ECU) 50. Depending on the construction of the host 10H of FIG. 1, the torque actuators 20 may include, e.g., an internal combustion engine (E) 22 and an associated engine control module 22M, an electric traction motor ($M_E$) 24 and an associated motor control module 24M, and a brake actuator (B) 26 and an associated brake control module 26M. Each respective one of the control modules 22M, 24M, and 26M may be embodied as one or more printed circuit boards, requisite sensors, and communication and control logic (not shown) for ultimately controlling an output torque $T_E$, $T_M$, and $T_B$ of the engine 22, motor 24, and brake actuators 26, respectively, as appreciated in the art.

The sensor suite 18 may include, without limitation, a plurality of vehicle mounted sensors $S_1, S_2, \ldots, S_N$, i.e., sensors 19, 21, and 23, respectively. The sensor suite 18 is used to scan, examine, and evaluate an area in front of (and to the sides of) the host 10H of FIG. 1. For instance, the sensors 19, 21, and 23 may include various cameras mounted in suitable forward and/or sideward looking positions and orientations, e.g., to the vehicle body 14 shown in FIG. 1. The sensors 19, 21, and 23 may also include forward-looking object detection sensors operable for monitoring the surrounding environment, for example radar, lidar, or near-field sensing sensors, cameras and/or video-recognition systems, or other sensing systems capable of performing the described functions. Additionally, the sensors 19, 21, and 23 may include one or more sensors for determining a yaw rate ($\psi$) of the host 10H, an on/off state of turn signals (not shown) of the host 10H, and an angle sensor operable for determining a steering wheel angle ($\delta$) and steering rate ($\dot{\delta}$). These additional values are used as inputs to the method 100 as described below.

In a possible embodiment, the sensor suite 18 of FIG. 2 may detect objects in the field-of-view of the host 10H of FIG. 1, with such objects including the target 10T. In addition to detecting the presence of objects and other vehicles, the sensor suite 18 is also configured to determine the ground speed and acceleration of the target 10T, either objectively or relative to the host 10H. The sensor suite 18 is also operable for sensing a linear distance between the host 10H and the target 10T as part of the present control strategy. Together with the speed and/or acceleration of the target 10T relative to the host 10H, the ACC system 11 of FIG. 2 is able to determine a time gap between the host 10H and the target 10T as an estimated amount of time between a rear end of the target 10T and a front end of the host 10H, assuming current vehicle speeds. For each target 10T, the sensor suite 18 may also determine the driving lane 12 relevant to the host 10H, longitudinal and lateral ranges and range rates, i.e., a rate at which the longitudinal and lateral ranges are changing, turning and brake light behavior, and speed relevant to surrounding traffic and road speed, to cite just a few possibilities.

The ECU 50 of FIG. 2 is depicted schematically as having a computer storage medium/memory (M) 52 and one or more processors (P) 54, the former being inclusive of non-transitory memory or tangible non-transitory storage media/devices (read only, programmable read only, solid-state, random access, optical, magnetic, etc.). The memory 52, on which computer-readable instructions embodying method 100 and its three parallel algorithms embodying methods 100A, 100B, and 100C of respective FIGS. 3-5 as described below are recorded, is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality.

Additionally with respect to the ECU 50, input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. The ECU 50 executes control routine(s) to provide desired functions. Ultimately, the ECU 50 outputs sensor control signals $CC_{18}$ to the sensor suite 18 and actuator control signals $CC_{20}$ to the torque actuators 20. Feedback signals may be received in return, as indicated by the double-headed arrow in FIG. 2. In this manner the ECU 50 is able to request sensing operations from the various sensors 19, 21, . . . , 23 and receive information in return, for instance radar, lidar, or other data. The ECU 50 is thus configured to control the dynamic state of the host 10H of FIG. 1 in response to an aggressive turning maneuver of the target 10T as set forth herein.

The ACC system 11 illustrated in FIG. 2 may be incorporated or included within another vehicle electronic module, such as an adaptive cruise control (ACC) module in a possible embodiment, or the ACC system 11 may be part of a larger network or system, e.g., an automated driving system, a lane departure warning system, an active safety system, a traction control system, an electronic stability control system, an antilock brake system, etc. Accordingly, the ACC system 11 of FIG. 2 is not limited to particular embodiments or arrangements when detecting and/or tracking the target 10T of FIG. 1 within the field of view of the host 10H.

The target 10T shown in FIG. 1 whose turning actions are observed by the host 10H herein is a "closest-in-path" (CIP) vehicle. In an adaptive cruise control scenario in which multiple vehicles may be detected by the host 10H at a given time, the CIP vehicle as used herein and in the art is the nearest detected vehicle, one typically located directly ahead of the host 10H, i.e., in the same lane 12. The ACC system 11 of FIG. 2 in a default mode uses information about the target 10T to maintain a preset following distance, which in turn entails automatically adjusting the speed of the host 10H via the torque actuators 20 to closely match the speed of the target 10T. When the CIP vehicle changes its speed or moves out of the lane 12, the ACC system 11 ordinarily returns to its previously recorded speed setting, or the ACC system 11 will track a new vehicle (not shown) entering the field of view of the sensor suite 18.

Figures 3, 4:
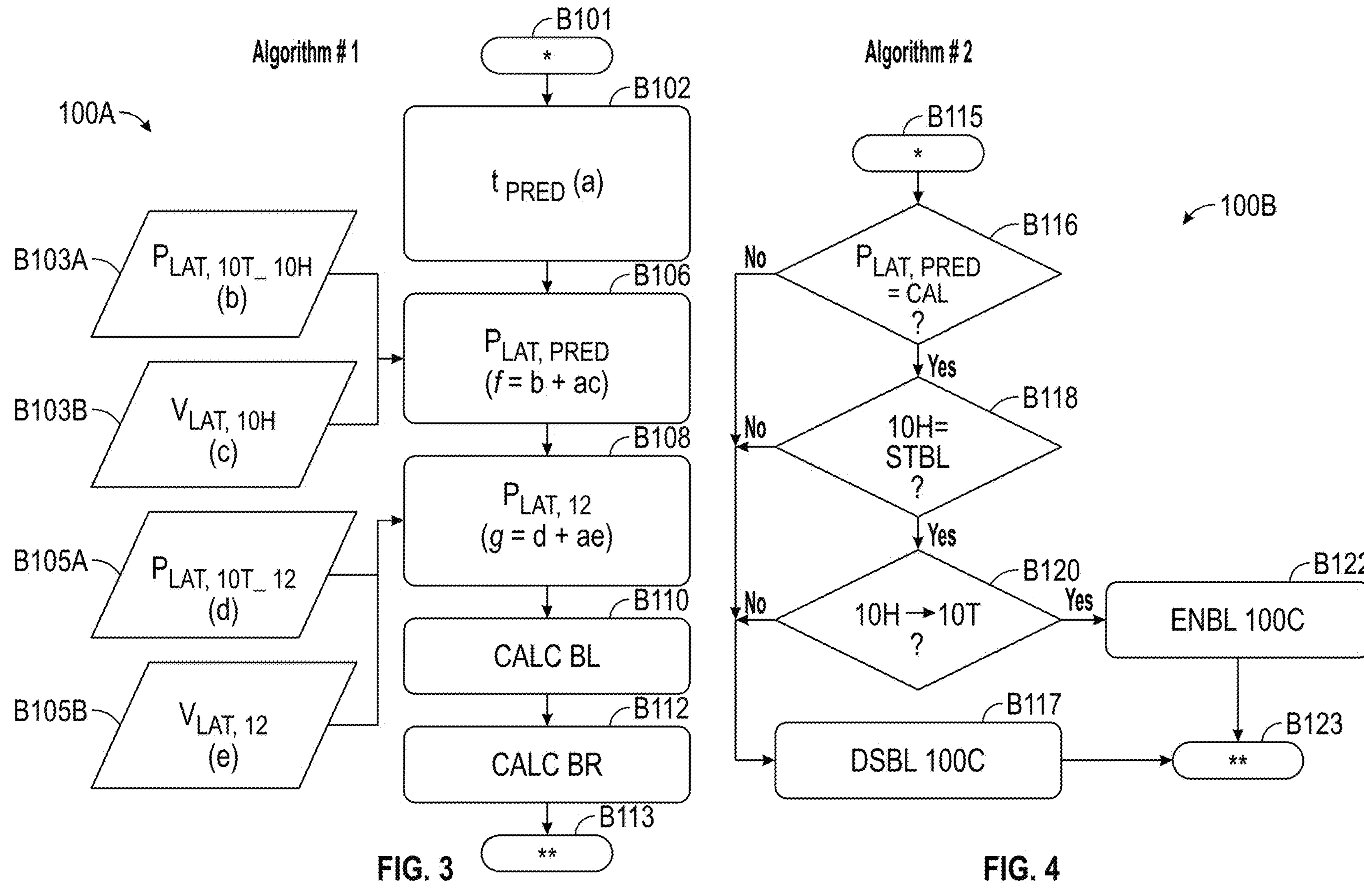
FIG. 3 is a flow chart describing a predictive portion ("Algorithm #1") performed by the control system of FIG. 2 as part of an adaptive cruise control (ACC)-assisted driving maneuver of the host of FIG. 1 during which a target vehicle ("target") rapidly exits a lane in which the host is traveling.
FIG. 4 is a flow chart describing conditional portion ("Algorithm #2") of the ACC-assisted driving maneuver described herein.
Figure 5:
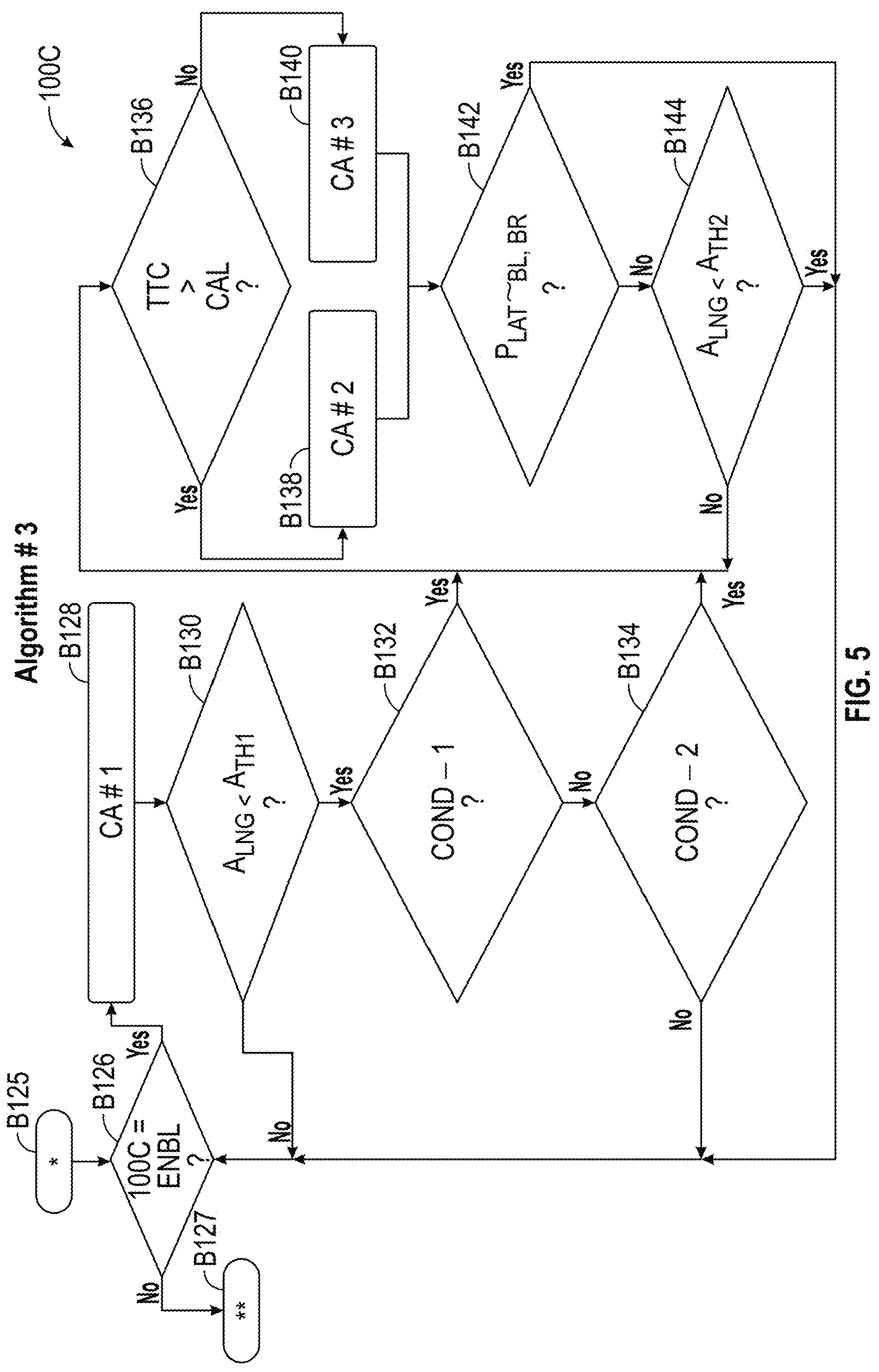
FIG. 5 is a flow chart describing an execution portion ("Algorithm #3") of the present method, with Algorithms #1,#2, and #3 of respective FIGS. 3, 4, and 5 being executed in parallel to control operation of the host illustrated in FIG. 1.

In contrast, by using parallel Algorithms #1,#2, and #3 of FIGS. 3-5 the ACC system 11 is able to selectively expedite acceleration of the host 10H after an aggressive turning maneuver of the target 10T, for instance the parking lot turning maneuver from point A to point B illustrated in FIG. 1. In this manner, the ACC system 11 is operable for controlling the dynamic state of the host 10H so that acceleration of the host 10H more closely matches a driver's desired acceleration performance. Application of the method 100 to control the host 10H when trailing a rapidly turning target 10T as exemplified in FIG. 1 will now be explained with reference to FIGS. 3, 4, and 5 and respective methods 100A, 100B, and 100C.

Referring to FIG. 3, the method 100A (Algorithm #1) is a first portion of the method 100 performed by the ECU 50 of FIG. 2. Method 100A is used to predict the lateral position of the target 10T relative to the host 10H given the current lateral position and velocity of the target 10T (also relative to the host 10H). Additionally, the method 100A calculates the location of boundaries BL and BR of the lane 12 of FIG. 1 relative to the host 10H, and also predicts the lateral position of the target 10T relative to the lane 12, given the current lateral position and velocity of the target 10T relative to the lane 12. The various predictions performed by Algorithm #1 of FIG. 3 are intended to be simple and deterministic in nature, while the prediction time may be calibrated to allow the present teachings to be adapted to different applications.

Beginning with initialization of the ECU 50 at block B101 (*), the method 100A proceeds to block B102 ("$t_{pred}$") where the ECU 50 of FIG. 2 determines a prediction time ($t_{pred}$), e.g., in seconds (s), using a lookup table stored in memory 52. Block B102 may be performed as a function of the longitudinal velocity of the host 10H, for instance by extracting the prediction time from such a lookup table based on the longitudinal velocity. Longitudinal velocity for its part may be determined and tracked by the ECU 50 during ongoing operation of the host 10H, for instance using the sensor suite 18 or other sensors of the host 10H. The method 100A proceeds to block B106 once the prediction time has been determined, with the prediction time referred to herein as value (a) for clarity and applied below in block B106.

Block B103A ("$P_{LAT,\ 10T\_10H}$") entails determining the current lateral position of the target 10T relative to the host 10H, i.e., as a value (b). The value (b) may be sensed by the sensor suite 18 of FIG. 2, temporarily stored in memory 52, and provided as an input to block B106 along with value (a) from block B102. The method 100A thereafter proceeds to block B106.

Block B103B ("$V_{LAT,\ 10H}$") entails using the sensor suite 18 to sense the current lateral velocity of the target 10T relative to the host 10H, i.e., as a value (c). Value (c) is temporarily stored in memory 52 of FIG. 2 and provided to block B106 as an input along with the above-noted values (a) and (b) from respective blocks B103A and B103B. The method 100A thereafter proceeds to block B106.

At block B105A ("$P_{LAT,\ 10T\_12}$"), the ECU 50 of FIG. 2 next sensing the current lateral position of the target 10T relative to the lane 12, i.e., as a value (d), once again using the various sensors of sensor suite 18 (FIG. 2). Value (d) is temporarily stored in memory 52 and provided to block B108 as an input. The method 100A then proceeds to block B108.

At block B105B ("$V_{LAT,12}$"), as a counterpart to block B105A the ECU 50 of FIG. 2, the ECU 50 senses or otherwise determines the lateral velocity of the target 10T relative to the lane 12, i.e., as value (e), using the sensor suite 18 of FIG. 2. Value (e) is temporarily stored in memory 52 and provided to block B108 as an input. The method 1O0A then proceeds to block B108.

Block B106 ("$P_{LAT,pred}$") includes calculating, estimating, or otherwise determining a predicted lateral position of the target 10T relative to the host 10H. This action may be performed by the ECU 50 of the ACC system 11 as a function of the prior values a, b, and c from blocks B102, B103A, and B103B, respectively. That is, the predicted lateral position may be determined as a value (f) as follows:

$$(f) = b + ac$$

where a is the prediction time from block B102, b is the current lateral position of the target 10T relative to the host 10H (block B103A), and c is the current lateral velocity of the target 10T relative to the host 10H from block B103B. The method 100A proceeds to block B108 upon determining the predicted lateral position (f) of the target 10T relative to the host 10H.

Block B108 ("$P_{LAT,12}$") includes calculating the predicted lateral position of the target 10T relative to the lane 12 of FIG. 1. This action may be performed as a function of the prior values a, d, and e from blocks B102, B105A, and B105B, respectively. That is, the predicted lateral position of the target 10T relative to the lane 12 may be determined as a value (g) as follows:

$$(g) = d + ae$$

The method 100A proceeds to block B110 upon determining the predicted lateral position of the target 10T relative to the lane 12.

Still referring to FIG. 3, block B 110 ("CALC BL") entails locating the left boundary BL of the lane 12, with an example left boundary BL illustrated in FIG. 1. For an example 12-foot (3.7-meter) lane 12, for instance, the left boundary BL may be located as BL=(lane width/2), or 6-feet to the left of a detected center of the lane 12, with the center (or left boundary BL) sensed via the sensor suite 18 of FIG. 2. Thus, block B110 may entail determining a width of the lane using the left boundary BL and right boundary BR. The method 100A thereafter proceeds to block B112.

Block B112 ("CALC BR") is analogous to block B110, and entails locating the right boundary BR of the lane 12, e.g., as BR=–(lane width/2). In keeping with the non-limiting 12-foot lane example of block B110, BR=–6 feet, with the negative (–) operator indicating that BR is located 6-feet to the right of the center of lane 12. The method 100A is finished () at block B113 after the locations of the left and right boundaries BL and BR of lane 12** have been located.

ALGORITHM #2: Referring now to FIG. 4, the method 100B is used to determine if the predicted lateral positions (values f and g from method 100A of FIG. 3) are reliable, i.e., sufficiently trustworthy and accurate for a given application. If so, the ECU 50 uses method 100B to consider the lateral stability of the host 10H in lane 12 of FIG. 1, and also whether the host 10H still trails the target 10T. Based on the criteria described below, the method 100B is ultimately used by the ECU 50 to decide whether to initiate Algorithm #3, i.e., method 100C of FIG. 5. Thus, block B113 of FIG. 3 continues to block B115 (*) of FIG. 4 with initiation of method 100B.

Upon successful initialization, method 100B proceeds from block B115 to block B116 ("$P_{LAT,pred}$=CAL?") where the ECU 50 of FIG. 2 determines whether the predicted lateral positions of the host 10H are trustworthy relative to a standard, as noted above. For example, the ECU 50 may determine if the sensed linear distance to the target 10T is less than a calibrated distance threshold. The method 100B of FIG. 4 proceeds to block B118 when the distance to the target 10T is less than the calibrated distance threshold, with the method 100B proceeding in the alternative to block B117.

Block B117 ("DSBL 100C") includes control the host 10H to the target 10T as per current state of the art ACC methods and disabling Algorithm #3 of FIG. 5. As appreciated, current state of the art ACC controls the host 10H to the nearest-detected vehicle, i.e., the closest-in-path (CIP) vehicle. The ACC system 11 of FIG. 2 may therefore use information about the target 10T to maintain a preset following distance or gap between the host 10H and target 10T, and automatically adjust the speed of the host 10H via control of the torque actuators 20 of FIG. 2. The method 100B thereafter proceeds to block B123.

Block B118 ("101H=STBL?") includes determining if the host 101H of FIG. 1 is laterally stable within the lane 12. In a possible implementation, the host 10H is deemed to be "laterally stable" in lane 12 by measuring performance parameters of the host 10H and determining if the host 10H is laterally stable within the lane 12 using the performance parameters. For instance, the ECU 50 may determine whether the following stability conditions are true: (i) the absolute value of a measured yaw rate ($\dot{\psi}$) of the host 10H is less than a yaw rate threshold, (ii) left/right turn signals of the host 10H are not activated, i.e., the driver is not presently signaling an impending turn, (iii) the absolute value of a steering angle ($\delta$) of the host 10H is less than a predetermined steering angle threshold, and (iv) the absolute value of a steering angle rate ($\dot{\delta}$) of the host 10H is less than a predetermined steering rate threshold. In this example, the performance parameters include the measured yaw rate ($\dot{\psi}$), a turn signal ON/OFF state, the steering angle ($\delta$), and the steering angle rate ($\dot{\delta}$), with the ECU operable for comparing the absolute values of the performance parameters to corresponding thresholds. The method 100B proceeds to block B120 when the conditions are true, and to block B117 in the alternative when one or more of the conditions are not true.

At block B120 ("10H→10T?") the ECU 50 of FIG. 2 determines whether the host 10H of FIG. 1 is still following the target 10T. In accordance with an aspect of the method 100B, the ECU 50 may answer this inquiry in the affirmative if the object identifier of the closest-in-path (CIP) target has not changed within the last X seconds (s), with X being a calibratable value, e.g., 1-3s. The method 100B proceed to block B122 when the ECU 50 ascertains that the host 10H is still following the target 10T in lane 12 of FIG. 1.

At block B122 ("ENBL 100C"), the ECU 50 of FIG. 2 next enables Algorithm #3 and proceeds to block B123 (), with block B123 signaling the end of method 100**B.

ALGORITHM #3: Referring now to FIG. 5, the method 100C is reached from block B123 of method 100B after Algorithm #3 is enabled at block B122, as noted above. In general, Algorithm #3 is configured to apply further criteria to determine whether to follow typical CIP-based controls or instead transition to the present control scheme, with the latter treating the control environment of the host 10H as if the target 10T of FIG. 1 is no longer located ahead of the host 10H.

Beginning with block B125 (*), the ECU 50 of FIG. 2 initializes Algorithm #3 and proceeds to block B126.

Block B126 ("100C=ENBL?") entails verifying whether block B122 (FIG. 4) has successfully enabled performance of the method 100C, for instance by verifying a predetermined bit code value or flag. The method 100C proceeds to block B145 when method 100C is not enabled, and to block B128 in the alternative when method 100C is successfully enabled.

At block B128 ("CA #1"), the ECU 50 of FIG. 2 executes a first adaptive cruise control (ACC) action that temporarily controls the host 10H based on actions of the target 10T, i.e., using default CIP-based control techniques as appreciated in the art. That is, the ACC system 11 of FIG. 2 may continue to monitor the target 10T and take required braking and/or acceleration actions in accordance with dynamic actions of the target 10T when maintaining speed of the host 10H and/or a following distance between the host 10H and target 10T. The method 100C thereafter proceeds to block B130.

At block B130 ("$A_{LNG}$<$A_{TH1}$?") the ECU 50 illustrated in FIG. 2 next determines whether the longitudinal acceleration of the host 10H of FIG. 1 is less than a calibratable entry acceleration threshold, i.e., $A_{TH1}$. The method 100C proceeds to block B132 when the longitudinal acceleration is less than the calibratable entry threshold, and to block B126 in the alternative when the longitudinal acceleration of the host 10H exceeds such a threshold.

At block B132 ("COND-1?"), the ECU 50 determines whether a first set of conditions is satisfied. The first set of conditions may include (1) whether the lateral position of the target 10T relative to the host 10H remains inside the lane boundaries BL and BR (blocks B110 and B112 of method 100B), and (2) the predicted lateral positions relative to the host 10H and the lane 12 are outside of the left lane boundary BL. The method 100C proceeds to block B136 when conditions (1) and (2) are satisfied. Block B126 is repeated in the alternative when the first set of conditions is not satisfied.

Block B134 ("COND-2?") is analogous to block B132, and includes determining if a second set of conditions is satisfied. The second set of conditions includes (1) the lateral position of the target 10T relative to the host 10H is inside the lane boundaries BL and BR (blocks B110 and B112 of method 100B), and (2) the predicted lateral positions relative to the host 10H and lane 12 are outside of the right lane boundary BR. The method 100C proceeds to block B136 when conditions (1) and (2) of the second set of conditions is satisfied. Block B126 is repeated when the second set of conditions is not satisfied.

Block B136 ("TTC>CAL?") includes determining a time-to-contact (TTC) value as a time duration after which the host 10H would contact a vehicle or other object located ahead of the target 10T, given the current velocities and positions of the host 10H and detected vehicle(s)/object(s). The TTC value is compared to a calibrated time threshold, e.g., 10s or another application suitable and speed-dependent value. The method 100C proceeds to block B138 when the TTC value exceeds the time threshold, and to block B140 in the alternative when the TTC value is less than the time threshold.

At block B138 ("CA #2"), the ECU 50 executes a second ACC action. In the second ACC action, which may be contrasted with the first ACC action of block B128, the ECU 50 controls the host 10H as if a vehicle is not present ahead of the target 10T. The method 100C thereafter proceeds to block B142.

At block B140 ("CA #3"), the ECU 50 executes a third ACC action. In the third ACC action, which likewise may be contrasted with the first ACC action of block B128, the ECU 50 controls the host 10H to a vehicle located ahead of the target 10T. That is, having determined at block B136 that a vehicle is present in front of the target 10T and the TTC value is sufficiently low relative to the time threshold described above in block B136, the ECU 50 performs the third ACC action in lieu of the second control action of block B138. The method 100C thereafter proceeds to block B142.

Block B142 ("$P_{LAT}$~BL, BR?") includes determining whether the lateral position of the target 10T relative to the host 10H, and the predicted lateral positions from method 100B, i.e., relative to the host 10H and lane 12, are inside of the previously located lane boundaries BL and BR of FIG. 1. The method 100C proceeds to block B126 when both conditions are true, and to block B144 in the alternative when one or both conditions are not true.

Block B144 ("$A_{LNG}$>$A_{TH2}$?") is analogous to block B130, and includes determining whether the longitudinal acceleration of the host 10H exceeds another calibratable entry acceleration threshold, i.e., $A_{TH2}$. The threshold $A_{TH2}$ is thus used as an exit threshold. If the longitudinal acceleration of the host 10H exceeds the exit threshold, the method 100C returns to block B126. The method 100C proceeds in the alternative to block B136 when the longitudinal acceleration is less than the exit threshold.

Block B145 () corresponds to termination of the method 100**C.

Implementation of the method 100 described herein, i.e., the methods 100A, 100B, and 100C of respective Algorithms #1, #2, and #4 of FIGS. 3-5, may therefore improve the responsiveness and operator satisfaction in vehicles or other mobile platforms equipped with adaptive cruise control (ACC) functionality. In terms of responsiveness, implementation of the method 100 reduces reaction times when the target 10T slows significantly, e.g., by about 300 ms to about 700 ms, with the target 10T slowing in this manner while turning out of the lane 12. The improved reaction times may be accessed without changes to sensing, perception, or control of the host 10H. Thus, the host 10H is able to transition to positive acceleration sooner than using typical CIP vehicle-based methods. The resulting acceleration response of the host 10H may be improved in situations in which the target 10T makes a rapid turn, for instance into a parking lot, at a stop light, or when the target 10T exits the lane 12 at lower decelerations or while accelerating.

Situationally, the ECU 50 of FIG. 2 transitions to control of the host 10H to temporality behave as though the target 10T is no longer present in the lane 12 ahead of the host 10H. This may entail temporarily disabling a default CIP-based ACC strategy in situations in which the target 10T exits the lane 12 under the conditions described above. Braking and torque commands may begin to ramp up about 500 ms sooner that would otherwise occur in the absence of the present teachings. By using the method 100, the host 10H has already transitioned to positive acceleration by the time the target 10T is out of the path of the host 10H. As a result, the dynamic behavior of the host 10H becomes more aligned with how a driver would typically respond in the absence of ACC-based driving automation. These and other benefits will be readily appreciated by those skilled in the art in view of the forgoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a host vehicle equipped with an adaptive cruise control (ACC) system and traveling in a lane, the method comprising:

sensing a current lateral position of a target vehicle relative to the host vehicle via the ACC system;

sensing a current lateral velocity of the target vehicle relative to the lane via the ACC system;

determining predicted lateral positions of the target vehicle, via the ACC system using the current lateral position of the target vehicle relative to the host and the current lateral velocity of the target vehicle relative to the lane, the predicted lateral positions including a predicted lateral position of the target vehicle relative to the host vehicle and a predicted lateral position of the target vehicle relative to the lane; and in response to the predicted lateral positions of the target vehicle being reliable relative to a calibrated standard distance threshold between the host vehicle and the target vehicle, the host vehicle being laterally stable in the lane relative to performance parameters of the host vehicle, and the host vehicle still following the target vehicle:

detecting when the target vehicle is decelerating and turning out of a path of the host vehicle at rates exceeding a corresponding threshold rate, while the host vehicle is being controlled in accordance with a default closest-in-path (CIP)-based ACC strategy; and temporarily disabling the default CIP-based ACC strategy and thereafter controlling a dynamic state of the host vehicle via the ACC system as if the target vehicle is no longer located in the path of the host vehicle, thus causing the host vehicle to transition to positive acceleration.

2. The method of claim 1, wherein detecting when the target vehicle is decelerating and turning out of the path of the host vehicle includes sensing a current lateral position of the target vehicle relative to the lane via one or more sensors of the ACC system.

3. The method of claim 1, wherein determining the predicted lateral positions of the target vehicle relative to the lane includes locating a left boundary and a right boundary of the lane via the ACC system, and determining a width of the lane using the left boundary and the right boundary.

4. The method of claim 1, further comprising:

measuring performance parameters of the host vehicle; and determining if the host vehicle is laterally stable within the lane using the performance parameters.

5. The method of claim 4, wherein measuring the performance parameters of the host vehicle includes measuring a yaw rate, a turn signal ON/OFF state, a steering angle, and a steering angle rate of the host vehicle, and wherein determining if the host vehicle is laterally stable within the lane using the performance parameters includes comparing absolute values of the performance parameters to corresponding thresholds via the ACC system.

6. The method of claim 1, wherein detecting when the target vehicle is decelerating and turning out of a path of the host vehicle at rates exceeding a corresponding threshold rate includes comparing a longitudinal acceleration of the host vehicle to an acceleration threshold, and temporarily disabling the default CIP-based ACC strategy when the longitudinal acceleration of the host vehicle is less than the acceleration threshold.

7. The method of claim 1, further comprising:

determining a time-to-contact (TTC) value as a time duration after which the host vehicle would contact an object located in front of the target vehicle, given current velocities and positions of the host vehicle and object; and controlling the dynamic state of the host vehicle via the ACC system (i) as if the target vehicle is no longer located in the path of the host vehicle only when the TCC value is greater than a time threshold, and (ii) to a vehicle located ahead of the target vehicle only when the TCC value is less than the time threshold.

8. An adaptive cruise control (ACC) system for a host vehicle traveling in a lane, comprising:

a sensor suite connected to the host vehicle; and an electronic control unit (ECU) in communication with the sensor suite, the ECU including a processor and a computer storage medium on which is record instructions, wherein execution of the instructions by the processor causes the ECU to:

sense a current lateral position of a target vehicle relative to the host vehicle;

sense a current lateral velocity of the target vehicle relative to the lane;

determine predicted lateral positions of the target vehicle using the current lateral position of the target vehicle relative to the host vehicle and the current lateral velocity of the target vehicle relative to the lane, the predicted lateral positions including a predicted lateral position of the target vehicle relative to the host vehicle and a predicted lateral position of the target vehicle relative to the lane; and in response to the predicted lateral positions of the target vehicle being reliable relative to a calibrated standard distance threshold between the host vehicle and the target vehicle, the host vehicle being laterally stable in the lane relative to performance parameters of the host vehicle, and the host vehicle still following the target vehicle:

detect when the target vehicle is decelerating and turning out of a path of the host vehicle at rates exceeding above a corresponding threshold rate, while the host vehicle is being controlled in accordance with a default closest-in-path (CIP)-based ACC strategy; and temporarily disable the default CIP-based ACC strategy and thereafter controlling a dynamic state of the host vehicle via the ACC system as if the target vehicle is no longer located in the path of the host vehicle, thus causing the host vehicle to transition to positive acceleration.

9. The ACC system of claim 8, wherein the execution of the instructions by the processor causes the ECU to detect when the target vehicle is decelerating and turning out of the path of the host vehide by sensing a current lateral position of the target vehicle relative to the lane.

10. The ACC system of claim 8, wherein the execution of the instructions by the processor causes the ECU to determine the predicted lateral positions of the target vehicle relative to the lane by locating a left boundary and a right boundary of the lane, and to determine a width of the lane using the left boundary and the right boundary.

11. The ACC system of claim 8, wherein the execution of the instructions by the processor causes the ECU to:

measure performance parameters of the host vehicle; and determine if the host vehicle is laterally stable within the lane using the performance parameters.

12. The ACC system of claim 8, wherein the execution of the instructions by the processor causes the ECU to measure the performance parameters of the host vehicle by measuring a yaw rate, a turn signal ON/OFF state, a steering angle, and a steering angle rate of the host vehicle, and to determine if the host vehicle is laterally stable within the lane using the performance parameters by comparing absolute values of the performance parameters to corresponding thresholds.

13. The ACC system of claim 8, wherein the execution of the instructions by the processor causes the ECU to detect when the target vehicle is decelerating and turning out of a path of the host vehicle at rates exceeding corresponding thresholds by comparing a longitudinal acceleration of the host vehicle to an acceleration threshold, and to temporarily disable the default CIP-based ACC strategy when the longitudinal acceleration of the host vehicle is less than the acceleration threshold.

14. The ACC system of claim 8, wherein the execution of the instructions by the processor causes the ECU to:

determine a time-to-contact (TTC) value as a time duration after which the host vehicle would contact an object located in front of the target vehicle, given current velocities and positions of the host vehicle and object; and control the dynamic state of the host vehicle (i) as if the target vehicle is no longer located in the path of the host vehicle only when the TCC value is greater than a time threshold, and (ii) to a vehicle located ahead of the target vehicle only when the TCC value is less than the time threshold.

15. A host vehicle comprising:

a vehicle body;

a set of road wheels connected to the vehicle body;

a set of torque actuators operable for controlling a dynamic state of the host vehicle; and an adaptive cruise control (ACC) system comprising:

a sensor suite connected to the vehicle body; and an electronic control unit (ECU) in communication with the sensor suite, the ECU including a processor and a computer storage medium on which is record instructions, wherein execution of the instructions by the processor causes the ECU to:

sense a current lateral position of a target vehicle relative to the host vehicle;

sense a current lateral velocity of the target vehicle relative to a lane;

determine predicted lateral positions of the target vehicle using the current lateral position of the target vehicle relative to the host vehicle and the current lateral velocity of the target vehicle relative to the lane, the predicted lateral positions including a predicted lateral position of the target vehicle relative to the host vehicle and a predicted lateral position of the target vehicle relative to the lane; and in response to the predicted lateral positions of the target vehicle being reliable relative to a calibrated standard distance threshold between the host vehicle and the target vehicle, the host vehicle being laterally stable in the lane, and the host vehicle still following the target vehicle:

detect when the target vehicle is decelerating and turning out of a path of the host vehicle at rates exceeding above a corresponding threshold rate, while the host vehicle is being controlled in accordance with a default closest-in-path (CIP)-based ACC strategy; and temporarily disable the default CIP-based ACC strategy and thereafter control a dynamic state of the host vehicle as if the target vehicle is no longer located in the path of the host vehicle, thus causing the host vehicle to transition to positive acceleration.

16. The host vehicle of claim 15, wherein the execution of the instructions by the processor causes the ECU to sense a linear distance between the host vehicle and the target vehicle, and compare the linear distance to a calibrated distance threshold to determine whether the predicted lateral positions of the target vehicle are reliable.

17. The host vehicle of claim 15, wherein the execution of the instructions by the processor causes the ECU to measure the performance parameters of the host vehicle by measuring a yaw rate, a turn signal ON/OFF state, a steering angle, and a steering angle rate of the host vehicle, and to determine if the host vehicle is laterally stable within the lane using the performance parameters by comparing absolute values of the performance parameters to corresponding thresholds.

18. The host vehicle of claim 15, wherein the execution of the instructions by the processor causes the ECU to:

determine a time-to-contact (TTC) value as a time duration after which the host vehicle would contact an object located in front of the target vehicle, given current velocities and positions of the host vehicle and the object; and control the dynamic state of the host vehicle (i) as if the target vehicle is no longer located in the path of the host vehicle only when the TCC value is greater than a time threshold, and (ii) to a vehicle located ahead of the target vehicle only when the TCC value is less than the time threshold.

19. The method of claim 5, wherein measuring the performance parameters of the host vehicle includes measuring a turn signal ON/OFF state.

20. The host vehicle of claim 15, wherein the execution of the instructions by the processor causes the ECU to:

measure a turn signal ON/OFF state as one of the performance parameters of the host vehicle.

* * * * *